Patented Nov. 4, 1941

2,261,197

UNITED STATES PATENT OFFICE 2,261,197

GLASS POLISH

Woldemar Weyl, State College, Pa., assignor to American Optical Company, Southbridge, Mass., a voluntary association of Massachusetts No Drawing. Application October 12, 1939, Serial No. 299,185

15 Claims. (Cl. 51—308)

This invention relates generally to a polishing material, particularly adapted for the polishing of glass and other materials, as well as to the process of making the same.

Heretofore in the polishing of glass, as for example, in lens manufacture, in the manufacture of plate glass and other operations where special smoothness of the glass surfaces demand it, a material such as rouge is generally employed. The process of manufacturing rouge for this purpose, however, is attended with many difficulties, particularly with reference to the control of the operations so that an efficient polishing material, which will not scratch, is obtained. Consequently, in the manufacture of rouge for this purpose, many tons are produced and discarded when, after trial, it is found that the material is not of such physical characteristics as are demanded.

The object of the present invention generally stated is to provide a material which may be economically produced for polishing glass.

A further object of the invention is to provide a material and a process of treating the same whereby the characteristics of the resultant product may be controlled so as to produce a material having the desired polishing characteristics.

Further objects of the invention will appear to those skilled in the art when the following description is read.

In accordance with the present invention, generally stated, a clay is heat activated so as to dissociate alumina from the silica with which it is combined in the clay. In the process of activation molecular alumina ($Al_2O_3$) is released from the chemical combination in which it exists in the clay and is made available as a polishing material in proportions depending upon the composition of the original clay and upon the extent of the activation.

In general, any clay which is free from sand may be employed. That is to say, so long as the clay is free of grains of free silica, it is capable of being treated according to the process hereinafter particularly described and suitable for use as a raw material from which the polishing agent of the present invention may be produced. Anyone of a great variety of clays may be employed. For example, any suitable potters clay, ball clay, Georgia clay or kaolin, may be employed, but in case such clay is contaminated with sand or granular silica it is desirable to remove these contaminations, as for example by a process of air flotation. The clay before or after being subjected to the process of treatment in accordance with the present invention may be reduced to a fineness of about 300 mesh.

The present invention further contemplates that the activated clay may have added to it any of the known metal oxide polishing agents, as for example, an oxide of iron or aluminum. Such oxides may be introduced into the polishing agent in the form of an aqueous solution of a suitable salt of the metal concerned and then upon heating of the clay during the process of activation, the salt will become decomposed into metal oxide. For example, when it is desired to introduce ferric oxide into the polishing agent, a water solution of ferric chloride may be made up and sprayed upon the clay to be activated. Upon subsequent heating, the ferric chloride will be converted into ferric oxide. Likewise, stannous chloride or aluminum chloride may be employed in case it is desired to add tin oxide or aluminum oxide to the polishing agent. In such cases the added metal oxide is, to an extent, absorbed by the clay and consequently reposes upon the surface of clay particles in the form of a coating, the clay particles operating in this respect as a carrier for the added oxide.

In accordance with this invention the clay is activated by heat treatment at temperatures which, while sufficient to free aluminum from the chemical combinations in which it exists in the clay, are nevertheless insufficient to bring about vitrification of the clay. Such a temperature, depending upon the clay employed, is generally between 500° C., and 900° C. The heating of the clay at this temperature may be carried out for a time sufficient to accomplish the desired activation, that is to say, the heating continues until a substantial amount of molecular alumina has been freed in the clay. In order to ascertain when the heat activation treatment has proceeded to the desired extent, periodic samples of the material being treated may be subjected to any suitable test which will indicate the presence of free alumina. For example, the morin test may be employed with advantage. In such case, a sample of the material being treated is mixed with a morin solution and the solution exposed to the rays emanating from a lamp emitting suitable radiations such as long wave ultra-violet and very short wave visible. A suitable lamp is a deep purple so called ultra-violet mercury vapor lamp. Fluorescence of the morin solution under such a lamp indicates the presence of free alumina and the degree of fluorescence may, therefore, be employed as a guide for determining not only the extent of the activation but the amount of free alumina present in the product. When, therefore, the desired degree of fluorescence is observed, heating of the material may be discontinued, as the treatment is then complete. Upon cooling, the treated material will be found to be operative as a highly efficient glass polishing agent.

Other suitable indicator for free alumina may be used instead of morin.

Another test which is also useful because it gives a measure of the total surface available for doing work is the heat of wetting by turpentine or other polar liquids which give measurable effects at available temperatures. A suggested method is to place a weighed sample of the specimen in a flask at a temperature of approximately 100° C., drop a known volume of the liquid at a temperature of approximately 100° C. on it and observe the rise in temperature by a thermometer or thermocouple, the greater the rise the greater the activation. This rise can be used as a numerical measure of the activation.

This heat of wetting test can be used to determine the total active surface of other materials besides clay which can be used for polishing, such as earthy oxides of aluminum, chromium, iron, titanium, zirconium and the like.

In general clays are more fluorescent when subjected to the morin test. The morin test is done by making an alcoholic solution of morin and adding it to a quantity of the clay under test and then this is exposed to the long wave ultraviolet radiation. The inactivated clays do not give appreciable fluorescence. The fluorescence increases as the degree of activation is increased and the fluorescence is therefore a measure of the degree of activation. Likewise, with the turpentine test the rise of temperature is a numerical measure of the degree of activation. This gives complete control over the degree of activation produced in manufacturing these activated clays. The term "activation" is used as an expression which indicates that the clay has certain desired properties for polishing or other desired uses. Morin mentioned above is a commercially available organic dye.

As a specific example of the general procedure hereinbefore described, the desired quantity of the chosen clay, for example, Zettlitz kaolin, may be employed. Zettlitz kaolin will ordinarily be free of grains of silica but other clays which may be contaminated with granular silica may have the granular silica removed as by air flotation or any other convenient manner. The material may then be reduced to substantially the fineness desired in the finished product, for example 300 mesh.

The clay may then be charged into a suitable furnace and elevated to a temperature sufficient to drive off the moisture and to dissociate molecular alumina from the combined silica of the clay. In the case of Zettlitz kaolin, a temperature of 550 to 650° C. will accomplish this result. With other clays, however, a few experiments will indicate the precise temperature bracket which is most advantageous to employ.

Heating of the clay at the temperature indicated may proceed and samples taken periodically from the batch under treatment may be tested for fluorescence with a morin solution and a Moore vapor lamp, as hereinbefore indicated, until the desired degree of activation is achieved. In the case of Zettlitz kaolin about one hour of treatment at a temperature of 550 to 650° C. is ordinarily adequate. For clays having a lower content of alumina, the temperature of treatment and the period of treatment may be adjusted appropriately in order to accomplish the most efficient activation.

While the activated clay alone possesses desirable properties as a glass polishing agent, the efficiency of the material may be improved by the addition thereto of suitable metal oxides, such as ferric oxide, aluminum oxide or tin oxide. The present invention further contemplates a highly advantageous mode of introducing the added oxides into the clay. Regardless of the clay being treated, a water soluble salt of the chosen metal, as for example in the case of iron oxide, ferric chloride; in the case of aluminum oxide, aluminum chloride; in the case of tin oxide, stannous chloride, may be dissolved in water and the clay moistened as by spraying with the resultant solution. We have mentioned the metallic chlorides as being useful addition agents; other salts may be used, in fact, the nitrates are sometimes advantageous. Advantageous results are achieved when an amount of the solution sufficient to introduce from one to four per cent (on the basis of the dry clay) of the selected metal salt is applied. The wet material, when subjected to heat in the process of activation hereinbefore described, effects an oxidation of the salt so as to produce the corresponding metal oxide. The metal oxide in such cases reposes in the form of a coating on the particles of activated clay. It will be understood, of course, that other metal oxides than those hereinbefore specifically mentioned may be similarly applied, it being understood that any of the oxides known to be desirable polishing agents may be applied and incorporated with the clay in the manner just described.

Upon the conclusion of the treatment, the material will exist in a desirable condition and may be employed as a polishing agent for glass and other similar materials.

It has been found that it is very often advisable to subject the clays or kaolins not directly to the furnace atmosphere but to heat them indirectly for example in an electric furnace. This is advisable because the activated material in contact with combustion gases may form sulfates which impair the polishing properties of the material. The reaction is about as follows:

$$3SO_2 + 3/2 O_2 + Al_2O_3 = Al_2(SO_4)_3$$

In the treatment of the material which is to be activated, with salt solutions such as solutions of tin chloride or ferric chloride it is often preferable to wash the material with these solutions instead of spraying it therewith. Therefore it is obtained that a base exchange will take place and that such oxides as for example calcium oxide or sodium oxide which are natural contaminations of clays and which may impair the qualities of activated material are removed.

While in the foregoing description, reference has been made to the use of certain specific materials and to the employment of certain specific temperature and periods of treatment, it is to be distinctly understood that the invention is not limited to the precise details hereinbefore described but that it contemplates generally the heat activation of clay at a temperature which is below the temperature of vitrification but sufficiently high to accomplish a dissociation of alumina from the chemical combinations in which it exists in the clay. It is realized that many modifications and variations of the procedure hereinbefore set forth for the purpose of illustration will present themselves to those skilled in the art, and it is to be distinctly understood, therefore, that such modifications and variations as do not depart from the spirit of this invention are, although not specifically described herein, contemplated within the scope of the appended claims.

While I have mentioned directly the use of activated clays as polishing compounds, activated clays are useful for many other purposes and the methods disclosed are a guide to the best procedure for activating clays for other purposes.

Having thus described the invention, what is claimed is:

1. A polishing material for glass or other materials comprising unvitrified activated clay and a metal oxide as a minor constituent.

2. A polishing material for glass and the like comprising unvitrified clay containing a substantial amount of free alumina and oxide of iron as a minor constituent.

3. A polishing material for glass and the like comprising unvitrified clay containing a substantial amount of free alumina and oxide of tin.

4. In the art of activating clay, the process comprising, heating clay at temperatures of 500 to 900° C., sampling the clay during the process of heating, testing the fluorescence of the sample and discontinuing the heating when the test indicates that a substantial amount of free alumina is present.

5. In the art of activating clay, the process comprising, heating clay at temperatures of 500 to 900° C., sampling the clay during the process of heating, treating the sample with morin, observing the fluorescence, and discontinuing the heating when the test indicates that a substantial amount of free alumina is present.

6. In the art of activating clay, the process comprising, mixing clay with a metal salt of character which upon heating will be oxidized, and heating the mixture of clay and metal salt at a temperature sufficient to dissociate alumina from silica in the clay but below the temperature of vitrification.

7. In the art of activating clay, the process comprising, mixing clay with a stannous chloride and heating the mixture to 500 to 900° for a time sufficient to dissociate alumina from the silica in the clay.

8. In the art of activating clay, the process comprising mixing clay with alumina chloride and heating the mixture to 500 to 900° C. for a time sufficient to dissociate alumina from the silica in the clay.

9. The method of forming a polishing material comprising dissolving a metal salt in water, spraying the solution on clay, and heating the mixture to 500 to 900° C. for a time sufficient to dissociate alumina from the silica in the clay.

10. The method of forming a polishing material comprising dissolving a metal chloride in water, spraying the solution on clay, and heating the mixture to 500 to 900° C. for a time sufficient to dissociate alumina from the silica in the clay.

11. In the art of activating clay, the process comprising dissolving in water a metal salt of the character, which upon heating, will be oxidized, wetting clay with the solution, heating the mixture at 500 to 900° C., sampling the material during heating treating the sample with morin, observing the fluorescence, and discontinuing the heating when the test indicates that a substantial amount of alumina has been freed in the clay.

12. A polishing material for glass or other materials comprising unvitrified activated clay and a metal oxide as a minor constituent which has been heated at temperatures of 500 to 900 degrees C. until tests indicate that a substantial amount of free alumina is present.

13. A polishing material for glass or other materials comprising unvitrified activated clay containing a substantial amount of free alumina and oxide of iron as a minor constituent, which has been heated at temperatures of 500 to 900 degrees C. until tests indicate that a substantial amount of free alumina is present as shown by treating the sample with morin and observing the fluorescence.

14. A polishing material for glass or other materials comprising unvitrified activated clay containing a substantial amount of free alumina and oxide of tin, which has been heated at temperatures of 500 to 900 degrees C. until tests indicate that a substantial amount of free alumina is present as shown by testing the fluorescence of a sample of said material.

15. In the art of activating clay, the process of heating a mixture of clay and calculated amounts of ferric oxide to a temperature of 500 to 900° for a time sufficient to dissociate alumina from the silica in the clay while maintaining the clay in an unvitrified state.

WOLDEMAR WEYL.